Nov. 17, 1959 J. F. BARTRAM ET AL 2,913,622

BEAM POSITIONING APPARATUS

Filed Aug. 31, 1956 2 Sheets-Sheet 1

INVENTORS J. F. BARTRAM
D. H. EVANS

BY [signature]

ATTORNEY

BEAM POSITIONING APPARATUS

Filed Aug. 31, 1956

INVENTORS J. F. BARTRAM
D. H. EVANS
BY James W. Falk
ATTORNEY

United States Patent Office 2,913,622

Patented Nov. 17, 1959

2,913,622

BEAM POSITIONING APPARATUS

James F. Bartram, Madison, and David H. Evans, Whippany, N.J., assignors to Bell Telephone Laboratories, Incorporated, New York, N.Y., a corporation of New York Application August 31, 1956, Serial No. 607,413

14 Claims. (Cl. 315—21)

This invention relates to the stabilization of electron beam deflections and to voltage regulation and more particularly to electrical circuits employing electron beam positioning as an adjunct to voltage regulation.

Cathode ray discharge devices have been utilized heretofore in a wide variety of electrical system applications and continue to achieve increasing recognition in areas demanding sensitivity of control and high speed of operation. One such area is information storage. A remarkably large amount of information may be translated into electronic signals and "written" on discrete areas of a storage surface in a matter of microseconds and "read" from the surface as desired in a like interval of time. The cathode ray tube beam which assists in performing these functions must, of course, be deflected with extreme precision to assure contact with the desired discrete storage area. The deflection speed required adds to this burden. Such precision, of course, demands severe control of tolerances in the beam positioning elements with consequent increase in cost to provide and maintain such a storage unit. Additionally, the supply voltage servicing the unit must be free of drift since slight variations can cause misregistry of information due to faulty beam deflection.

The problem of beam deflection variations has been attacked through various schemes involving feedback to the deflection system of error signals formed by the beam itself. The error signals thus formed add to the input deflection signal to correct for beam deviations. Such schemes usually employ direct current feedback signals, the amplification of which is less economical than alternating current amplification. Additionally, such schemes do not correct, at the voltage source, for long term drift of the source itself or drift due to aging of components in the positioning circuit. Voltage regulation for high speed operation, of course, demands rapid correction of voltage drift to permit continuing satisfactory operation.

Accordingly it is an object of this invention to provide an improved means of voltage regulation.

Another object of this invention is to prevent drift in a voltage supply.

A further object of this invention is to correct rapidly and accurately for voltage drift in a positioning system.

It is still another object of this invention to assure exact positioning of an electron beam.

These and other objects of the invention are attained, in accordance with the invention, by the introduction to the deflecting elements of a cathode ray tube of an alternating voltage signal superimposed upon a supply voltage to be controlled. The supply voltage alone, or a portion thereof applied through a voltage dividing device, will cause the electron beam to be deflected to a certain angular position while the alternating signal will cause the beam to fluctuate about this angular position. An output current flows from the tube each time the beam achieves the degree of deflection desired due to the source voltage alone, which output is utilized to trigger a gating circuit. The alternating voltage applied to the deflection elements is applied simultaneously to the gating circuit and passed through the gate during the interval of the current pulse enabling the gating circuit. The signals passed through the gate activate a regulator element connected to the voltage source so as to adjust the supply voltage.

With the beam correctly positioned due to the applied portion of the supply voltage the gating circuit is triggered as the alternating current passes through zero so that no signal passes to the voltage regulator. With the beam incorrectly positioned, indicating an altered value of supply voltage at the deflection plates, the gating circuit is triggered at times when the alternating current has a value other than zero, thus providing a finite signal to the voltage regulator so as to adjust the source voltage.

In one specific illustrative embodiment of this invention a fine wire is positioned on the target screen of a cathode ray tube so as to receive electrons from a correctly deflected beam. The source of supply voltage to be controlled is connected to deflection plates of the tube in the coordinate of desired deflection so as to deflect the beam to impinge the positioning wire on the target screen, presupposing that the supply voltage is then at the correct level. Advantageously, a fixed proportion of the supply voltage may be utilized by connecting a suitable voltage divider between the source and deflection plates. An oscillator or other suitable means provides a sine wave signal which is introduced to the deflection circuit through a transformer thus causing the beam to fluctuate about the positioning wire. The oscillator signal also is passed to a gating circuit which may advantageously comprise logic devices capable of passing the oscillator signal present during the interval that the gate is enabled by signals from the positioning wire. The gate output is then amplified and filtered prior to application to the regulator device.

It is a feature of this invention that an electron tube have an associated positioning element, means including a primary voltage source for deflecting the beam to a steady state deflection position and other means including a varying secondary voltage source for deflecting the beam about the steady state deflection position and the positioning element, signal pulses being provided each time the beam impinges the positioning element which serve to adjust the primary voltage until the steady state deflection position coincides with that of the positioning element.

More specifically, in accordance with a feature of this invention, the positioning element passes a current established by the impingement of the deflected beam thereon which current activates gating means to pass signal pulses to a voltage regulator.

It is another feature of this invention that the means producing deflections of the beam about the steady state deflection position also provide the signal pulses passed by the gating means to the voltage regulator, such signal pulses being representative of the instantaneous amplitude of the varying secondary voltage present in the gating means.

A complete understanding of this invention and of the various features thereof, may be gained from consideration of the following detailed description and the accompanying drawing, in which:

Fig. 2(*b*) is a wave form illustrating the activating signals present during the beam deflection of Fig. 2(*a*);

Fig. 3(*b*) is a wave form illustrating the activating signals present during the beam deflection of Fig. 3(*a*);

Fig. 4(*b*) is a wave form illustrating the activating signals present during the beam deflection of Fig. 4(*a*);

Figure 1:
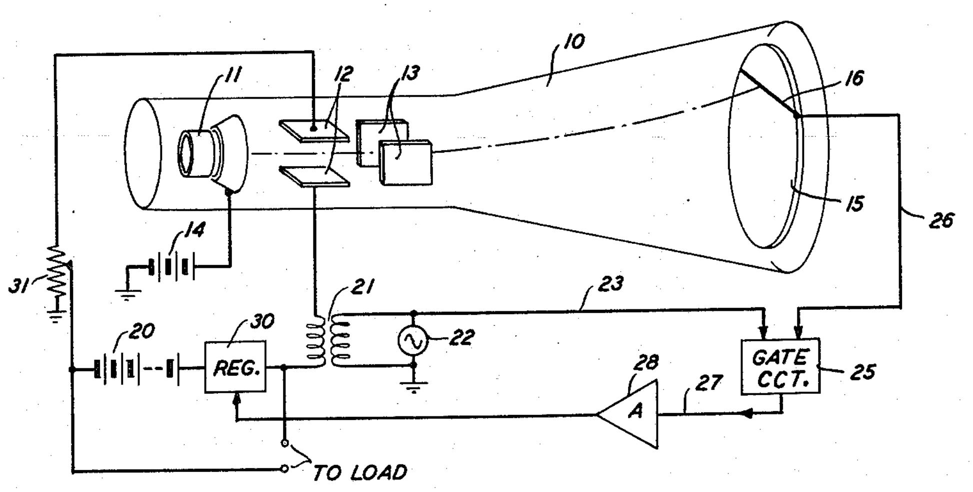
Fig. 1 is a schematic representation of one illustrative embodiment of this invention.

Referring now to the drawing, Fig. 1 is a schematic representation, mainly in block form, of one illustrative embodiment of a positioning and voltage regulating system in accordance with this invention. As there depicted, the system contains a cathode ray device comprising an evacuated enclosing vessel 10 at one end of which is mounted an electron gun 11 for provision of a suitable source of electrons and including an accelerating electrode supplied by an accelerating voltage source 14. Deflection plates 12 and 13 are arranged to deflect the electron beam over the target surface 15 in accordance with the potential applied between deflection plates 12 and 13. In this embodiment, only the vertical deflection plates 12 are energized so that deflection of the electron beam across the target surface 15 is restricted to the vertical plane although the system is equally applicable to deflection in the horizontal plane or in both planes with slight modification of target electrodes and related circuitry as will become evident hereinafter.

A discrete area of the target surface comprises a conducting element or a plurality of such elements capable of passing an electron current upon impingement by the electron beam at some point in the beam's vertical movement; for example, as illustrated in Fig. 1, a fine conducting wire 16 positioned on the target surface 15 in substantially a horizontal plane, may be utilized. Photoelectric pickup means, or other suitable means, may also be employed for this purpose, positioned so as to receive light only from a discrete area of a luminescent target surface through a suitable lens system.

A source of supply voltage for the various load devices demanding precisely controlled voltage such as various cathode ray storage tubes, is designated generally as 20. Source 20 and its regulator 30 are connected to the vertical deflection plates 12, in parallel with the load, through potentiometer 31 and the secondary coil of transformer 21. The conductive element 16 and potentiometer 31 are so arranged that the proportion of supply voltage from source 20 received at the deflection plates 12 will deflect the electron beam so as to impinge on the conductive element 16. An oscillator 22, or other suitable means of providing a constantly varying signal, is connected to the primary coil of transformer 21 so as to induce the varying signal into the deflection circuit. The oscillator is also connected to a gating circuit 25 over lead 23 so as to provide the identical wave form thereto simultaneous with its application to the deflection system. A second input to the gating circuit 25 over lead 26 transmits thereto the electron current provided by the electron beam impinging on the conductive element 16. Output signals from gating circuit 25 are transmitted over lead 27 through amplifier 28 to regulator circuit 30.

In operation, the supply voltage from source 20 is applied to the vertical deflection plates 12 causing the cathode ray tube beam to be deflected to some discrete area of target surface 15. If the source 20 is providing the proper voltage for the load involved, the beam will be deflected so as to impinge conductive element 16 on the target surface 15. Sine wave signals are applied by source 22 through transformer 21 to the deflection plates 12 so as to be superimposed on the supply voltage. The beam thus is deflected alternately up and down about the base deflection caused by the steady state supply voltage.

Figure 2A:
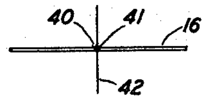
Fig. 2(*a*) illustrates the electron beam deflection when the desired supply voltage is applied in accordance with the illustrative embodiment of this invention.
Figure 2B:
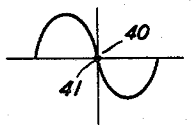

Assuming first, as in Fig. 2(*a*), that the supply voltage is correct so that the beam is deflected by the steady state portion of applied voltage to impinge conductive element 16 at point 40, a signal is transmitted over lead 26 to gating circuit 25 at the time of impingement serving to activate one input thereof. However, the sine wave from source 22 is passing through zero at this precise moment so that an output pulse on lead 27 to the regulator 30 is not forthcoming or is effectively zero. Thus, in Fig. 2(*b*) the zero point 41 of the sine wave signal coincides with the point 40 at which the beam trace 42 crosses the conductive element 16. In this instance the signal wave and the signal generated by the conductive element can be considered to be in phase at the gating circuit 25, and no correction signal is applied to lead 27 and regulator 30.

Figure 3A:
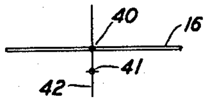
Fig. 3(*a*) illustrates the electron beam deflection when the supply voltage is below the desired value in accordance with the illustrative embodiment of this invention.
Figure 3B:
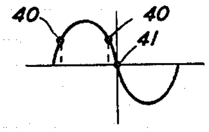

In Figs. 3(*a*) and 3(*b*) it is assumed that the supply source has drifted such that the steady state deflection of the beam causes the beam to impinge the target at point 41 below the conductive element 16. The cathode ray beam then will be deflected by the sine wave input so as to form the trace 42 on target surface 15 crossing the conductive element 16 at 40. As seen in Fig. 3(*b*), the sine wave will cause the beam to cross the conductive element 16 at two points 40 on the positive half wave so that gating circuit 25 will be triggered by both pulses on lead 26 to pass signals of the amplitude of the positive half wave at 40 in Fig. 3(*b*). These pulses will activate the regulator 30 to increase the supply voltage and will be provided until the supply voltage reaches the desired value evidenced by the pattern of Fig. 2. In this instance the signals generated by the element 16 can be considered advanced in phase relative to the sine wave at the gate circuit.

Figure 4A:
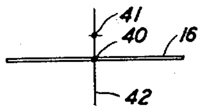
Fig. 4(*a*) illustrates the electron beam deflection when the supply voltage is above the desired value in accordance with the illustrative embodiment of this invention.
Figure 4B:
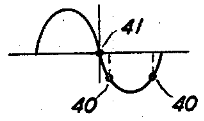

Should the supply voltage become too strong, the pattern of Fig. 4(*a*) develops, wherein the steady state value 41 in the trace 42 appears above the conductive element 16. The sine wave now causes the beam to cross the element 16 during the negative half wave so that the gating circuit 25 will be triggered when negative pulses of amplitude 40 are present on input lead 23. Such pulses will activate the regulator 30 to decrease the supply voltage and will continue until the pattern of Fig. 2 is restored, this being considered to be the case where the generated signals lag in phase with respect to the sine wave signal at the gate circuit.

Gating circuit 25 may comprise logical AND circuits well known in the art which function to gate signals received over lead 23 to lead 27 in response to receipt of signals over lead 26. Thus an output is present only when input signals are present on both input leads 23 and 26. The output is zero if signals are not present on both input leads 23 and 26.

Figure 5:
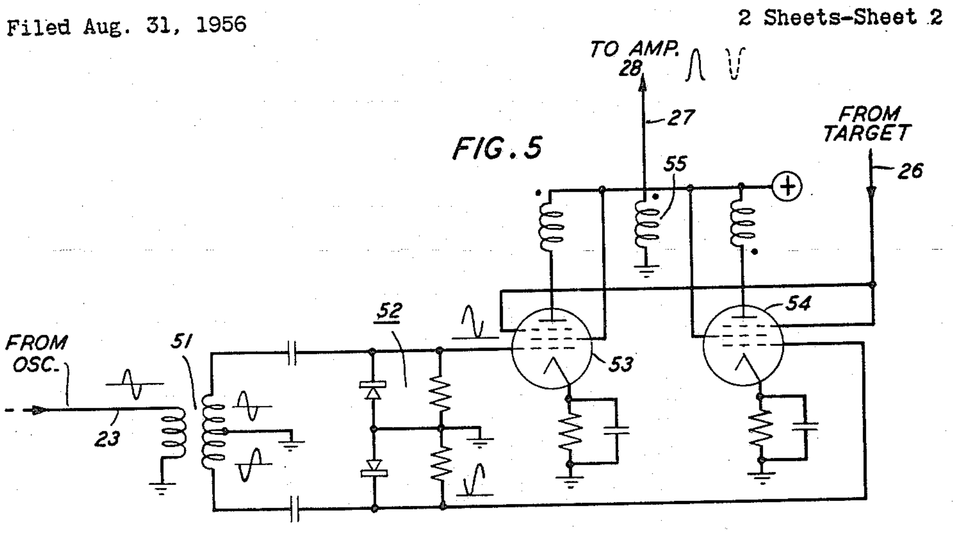
Fig. 5 is a gating circuit suitable for use in accordance with the illustrative embodiment of this invention.

Fig. 5 shows a typical gating circuit for use in the illustrative embodiment of this invention. As depicted in Fig. 5 the sine wave output of oscillator 22 is applied to the primary coil of transformer 51 having a divided secondary so as to pass the induced wave in opposite phase to clamping circuit 52. The respective waves are clamped to ground in circuit 52 and applied to the control grids of pentodes 53 and 54, each of which serves as an AND logic gate. The applied sine wave on the control grid is itself insufficient to render the tubes 53 or 54 conducting, but upon receipt of a signal pulse from the target electrode over lead 26, the tubes 53 and 54 will conduct at a voltage proportional to the instantaneous value of the applied sine wave.

The output signal of each tube 53 and 54 is induced in winding 55, oppositely coupled to windings in the respective plate circuits, such that a positive or negative signal pulse will be transmitted over lead 27 to the regulator circuit. The amplitude of this signal pulse will be determined by the amplitude of the control grid pulse in each tube 53 and 54 at the instant the triggering pulse is received therein over lead 26.

Dependent upon the requirements of the particular regulator circuit 30 utilized, the pulses passed by the gating circuit 25 may reflect the amplitude of the sine wave at the moment of triggering as shown for the illustrative embodiment; may be modified to reflect only the sign of the instantaneous signal by clipping the signal above and below zero prior to application to the gating circuit 25; or they may be modified to reflect only the phase of the pulses, the time between successive pulses of a pair being inversely proportioned to the error so that the elapsed time between pulses and the sign of the sine wave signal will provide a signal dependent on the amount of error.

The regulator circuit receiving the amplified, filtered pulses may comprise a vacuum tube with its plate circuit connected to the rectified source and cathode connected to the load. The gating circuit output pulses then may be integrated in a capacitive circuit coupled to the control grid of the regulator tube. Thus, a positive pulse charges a condenser to a higher level which level is imparted to the tube's control grid and serves to reduce the effective resistance of the tube, effectively increasing the voltage applied to the load. A negative pulse builds up a negative charge on a condenser tending to decrease the effective grid voltage and increase the regulator tube resistance so as to reduce the voltage applied to the load.

Figure 6:
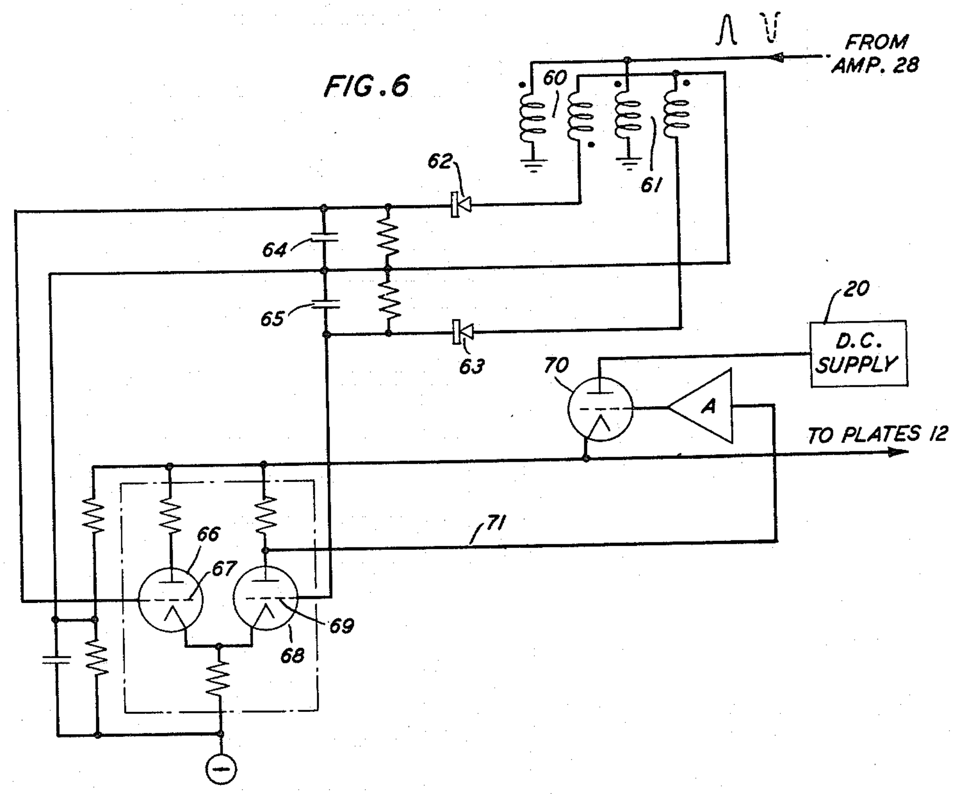
Fig. 6 is a regulating circuit suitable for use in accordance with the illustrative embodiment of this invention.

An example of a regulatory circuit utilizing the sine wave amplitude at the moment of triggering is shown in Fig. 6. As there depicted, an amplified signal pulse, either positive or negative, is applied to the primary windings of transformers 60 and 61, the secondary coils of which are oppositely wound so as to provide inverse pulses to diodes 62 and 63. Assume, for this example, that a positive signal pulse is received in transformers 60 and 61. Diode 62 will receive a positive pulse and pass it to capacitor 64, charging it to the peak voltage of the pulse. This peak voltage will appear at the grid 67 of difference amplifier tube 66. The positive input signal pulse will be inverted at the output of transformer 61 and will be blocked by diode 63. Thus, capacitor 65 fails to charge and the grid 69 of difference amplifier tube 68 is unaffected. Conduction through tube 66 increases, making the cathode of tube 68 more positive so as to reduce conduction therethrough. A more positive signal thus appears on lead 71 to regulator tube 70, and tube 70 conducts more heavily increasing the supply voltage applied to the deflection plates.

A negative signal pulse presented to transformers 60 and 61 provides a positive pulse to diode 63 charging capacitor 65 and increasing conduction through tube 68. A more negative signal thus appears on lead 71 to regulator tube 70. Tube 70, in this instance, impedes conduction, decreasing the supply voltage applied to the deflection plates.

Thus, the regulator tube conducts more or less in an amount determined by the amplitude of the input signal pulse received from the gating circuit so as to control the supply voltage. A long discharge time constant on capacitors 64 and 65 assists in maintaining the voltage level as determined by the input signal pulses.

Various pickup means other than the conductive element 16 may be employed, such as a photocell pickup unit outside a luminescent screen with suitable focusing elements.

Accordingly, it is to be understood that the above-described arrangements are merely illustrative of the application of the principles of the invention. Numerous other arrangements may be made by those skilled in the art without departing from the spirit and scope of the invention.

What is claimed is:

1. A voltage regulator circuit comprising a cathode ray tube including electron gun means and deflection means, means responsive to the electron beam from said gun means for generating an electrical signal, a gate circuit connected to and triggered by a signal from said generating means, a source of steady state supply voltage connected to said deflection means, a source of varying voltage connected between said deflection means and said gate circuit, said deflection means responsive to voltage from said sources to deflect said beam to impinge on said generating means periodically so as to generate electrical signals, and means connected between the output of said gate circuit and said supply voltage source for regulating said supply voltage in accordance with the output signal from said gate, said output signal being related to the instantaneous phase of said varying voltage upon receipt in said gate circuit of said trigger signal.

2. An electrical circuit comprising an electron discharge device having electron gun means and deflection means, means responsive to the electron beam from said gun means for generating electrical signals, AND circuit gating means connected to said generating means, a supply voltage source and a varying voltage source, each connected between said deflection means and said gating means, said deflection means deflecting said beam to impinge on said generating means in response to voltage from said sources to generate an electrical signal, said gating means being triggered by said electrical signal to provide an output signal indicative of the instantaneous phase of said varying voltage, and means responsive to said output signal to regulate said supply voltage.

3. An electrical circuit in accordance with claim 2 wherein said signal generating means comprises target means including a conductive element.

4. An electrical circuit in accordance with claim 2 wherein said gating means comprises means to provide an output signal proportional to the instantaneous amplitude of said varying voltage.

5. An electrical circuit in accordance with claim 2 wherein said gating means comprises means to provide an output signal having the polarity of said varying voltage at said instantaneous phase.

6. An electrical circuit comprising an electron discharge device having electron gun means forming and projecting an electron beam and deflection means, means responsive to the electron beam from said gun means deflected to a certain degree for generating an electrical signal, gating means connected to said signal generating means, first and second voltage sources each connected between said deflection means and said gating means, said deflection means responsive to voltage from said first source to deflect said electron beam to a first position and responsive to voltage from said second source to vary the amount of deflection uniformly about said first deflection position so as to include said certain degree of deflection, said gating means responsive to a signal from said signal generating means to provide an output signal indicative of the instantaneous phase of said second voltage, and means responsive to said output signal to regulate said first voltage.

7. The combination in a voltage regulating system of conductive means responsive to an electron beam, means deflecting an electron beam relative to said conductive means, means applying a steady state voltage and a constantly varying voltage to said deflecting means, means regulating said steady state voltage in response to a signal pulse initiated by current flow in said conductive means at a certain deflection of said electron beam, said signal pulse bearing a relation to the instantaneous phase of said constantly varying voltage at the time of said current flow in said conductive means, gating means connected between said conductive means and said regulating means, and means applying said constantly varying voltage between said deflection means and said gating means, said gating means passing said signal pulse to said regulating means.

8. The combination in accordance with claim 7 wherein said conductive means comprises a conductive element positioned on a target impinged by said electron beam.

9. An electrical circuit comprising an electron discharge device including target means, means for projecting an electron beam against said target means, means including a source and regulator of a supply voltage for deflecting said beam, gating means, and a varying voltage source coupled between said deflecting means and gating means, said target means being connected to said gating means and responsive to impingement of said beam thereon to enable said gating means to pass a signal corresponding to the instantaneous amplitude and polarity of said varying voltage to said voltage regulator.

10. An electrical circuit in accordance with claim 9 wherein said varying voltage source comprises an ascillator.

11. An electrical circuit in accordance with claim 9 wherein said varying voltage source comprises an oscil- wire positioned in a plane transverse to the plane of beam deflection.

12. An electrical circuit comprising a conductive element, a cathode ray tube including electron gun means for projecting an electron beam toward said conductive element and means for deflecting the electron beam so as to energize said conductive element upon application of a certain voltage to said deflecting means, a source of steady state supply voltage connected to said deflecting means, a logic gate, a source of sine wave signals coupled between said deflecting means and a first input of said logic gate, means connecting said conductive element to a second input of said logic gate, and means connected to the output of said logic gate for regulating said supply voltage, said logic gate responsive to a signal at said second input to pass a signal representative of the instantaneous signal amplitude at said first input to said regulating means.

13. An electrical circuit comprising a conductive element, a cathode ray tube including electron gun means for projecting an electron beam toward said conductive element and means for deflecting the electron beam so as to energize said conductive element upon application of a certain voltage to said deflecting means, a source of steady state supply voltage connected to said deflecting means, a source of sine wave signals coupled to said deflecting means, a logic gate, means connecting said sine wave signal source to a first input of said logic gate, means connecting said conductive element to a second input of said logic gate, and means connected to the output of said logic gate for regulating said supply voltage, said logic gate responsive to a signal at said second input to pass a signal representative of the instantaneous signal amplitude at said first input to said regulating means, said conductive element comprising a fine wire positioned in a plane transverse to the plane of beam deflection.

14. An electrical circuit comprising a cathode ray tube including a target surface, electron gun means for projecting an electron beam toward said target surface, a conductive element positioned between said electron gun and said target surface and single coordinate deflection means arranged to deflect said beam across said conductive element, means applying a steady state voltage to said deflection means, a logic gate, means coupling an alternating voltage between the deflection circuit and said logic gate, means regulating said steady state voltage, and means connecting said logic gate to said regulating means, said logic gate responsive to a current impulse from said conductive element to pass a signal dependent upon the instantaneous value of said alternating voltage to said regulating means.

References Cited in the file of this patent

UNITED STATES PATENTS

| | | |
|---|---|---|
| 2,335,670 | Holters et al. | Nov. 30, 1943 |
| 2,523,162 | Sunstein | Sept. 19, 1950 |
| 2,649,542 | Glass | Aug. 18, 1953 |
| 2,691,743 | Urtel | Oct. 12, 1954 |
| 2,710,362 | Ashby | June 7, 1955 |
| 2,717,994 | Dickinson et al. | Sept. 13, 1955 |
| 2,718,611 | McNaney | Sept. 20, 1955 |
| 2,772,390 | Woodruff | Nov. 27, 1956 |